(12) United States Patent
Williams

(10) Patent No.: US 10,815,016 B2
(45) Date of Patent: Oct. 27, 2020

(54) DEPLOYED ELECTROMAGNETIC RADIATION DEFLECTOR SHIELD ASSEMBLY

(71) Applicant: Richard Williams, Atlanta, GA (US)

(72) Inventor: Richard Williams, Atlanta, GA (US)

( * ) Notice: Subject to any disclaimer, the term of this patent is extended or adjusted under 35 U.S.C. 154(b) by 0 days.

(21) Appl. No.: 16/740,644

(22) Filed: Jan. 13, 2020

(65) Prior Publication Data
US 2020/0148398 A1    May 14, 2020

Related U.S. Application Data

(62) Division of application No. 15/477,115, filed on Apr. 2, 2017.

(51) Int. Cl.
*B64G 1/54* (2006.01)
*B64G 1/42* (2006.01)

(52) U.S. Cl.
CPC ............. *B64G 1/543* (2013.01); *B64G 1/42* (2013.01); *B64G 1/546* (2013.01)

(58) Field of Classification Search
CPC ........... B64G 1/543; B64G 1/546; B64G 1/54
See application file for complete search history.

(56) References Cited

U.S. PATENT DOCUMENTS

| | | | |
|---|---|---|---|
| 5,044,579 A | 9/1991 | Bernasconi et al. | |
| 6,945,499 B1 | 9/2005 | Robinson | |
| 7,413,147 B2 | 8/2008 | Bae | |
| 7,464,901 B2 * | 12/2008 | Kinstler | B64G 1/54 174/353 |
| 7,484,691 B2 | 2/2009 | Kinstler | |
| 7,637,461 B1 | 12/2009 | Spanjers | |
| 8,083,407 B2 | 12/2011 | Attina | |
| 8,210,481 B2 * | 7/2012 | Kinstler | B64G 1/54 174/353 |
| 8,251,315 B2 | 8/2012 | Leyre | |
| 8,550,406 B2 * | 10/2013 | Bigelow | B64G 1/54 244/158.1 |
| 8,740,154 B2 | 6/2014 | Bamford et al. | |
| 9,296,252 B2 | 3/2016 | Masecar | |
| 10,011,372 B2 | 7/2018 | Dong | |
| 10,583,939 B2 | 3/2020 | Williams | |

(Continued)

OTHER PUBLICATIONS

Williams, Richard; Applicant-Initiated Interview Summary for U.S. Appl. No. 15/477,115, filed Apr. 2, 2017, dated Sep. 11, 2019, 3 pgs.

(Continued)

*Primary Examiner* — Philip J Bonzell
(74) *Attorney, Agent, or Firm* — Taylor English Duma LLP

(57) ABSTRACT

Example aspects of a deployed electromagnetic radiation deflector shield assembly and a method for using a deployed electromagnetic radiation deflector shield are disclosed. The deployed electromagnetic radiation deflector shield assembly can comprise a base station on a ground surface; a deployed electromagnetic radiation deflector shield comprising an electromagnet configured to generate a magnetic field configured to deflect radiation from a radiation source; and an upright supporting the deployed electromagnetic radiation deflector shield at a distance away from the base station, and wherein the distance is configured to prevent the magnetic field from interfering with the base station.

13 Claims, 9 Drawing Sheets

(56) References Cited

U.S. PATENT DOCUMENTS

| | | | |
|---|---|---|---|
| 10,633,121 B2* | 4/2020 | Trainor | B64G 1/543 |
| 2006/0169489 A1* | 8/2006 | Kinstler | B64G 1/54 |
| | | | 174/350 |
| 2009/0084903 A1* | 4/2009 | Kinstler | B64G 1/54 |
| | | | 244/171.7 |
| 2010/0034358 A1 | 2/2010 | Attina | |
| 2011/0049303 A1 | 3/2011 | Bamford et al. | |
| 2012/0318928 A1* | 12/2012 | Bigelow | B64G 1/54 |
| | | | 244/171.7 |
| 2013/0037656 A1 | 2/2013 | Messano, Jr. | |
| 2017/0121038 A1 | 5/2017 | Dong | |
| 2018/0281995 A1 | 10/2018 | Williams | |
| 2018/0370660 A1* | 12/2018 | Trainor | B64G 1/546 |
| 2020/0270000 A1 | 8/2020 | Williams | |

OTHER PUBLICATIONS

Williams, Richard; Corrected Notice of Allowance for U.S. Appl. No. 15/477,115, filed Apr. 2, 2017, dated Jan. 24, 2020, 4 pgs.
Williams, Richard; Final Office Action for U.S. Appl. No. 15/477,115, filed Apr. 2, 2017, dated Jul. 26, 2019, 14 pgs.
Williams, Richard; Notice of Allowance for U.S. Appl. No. 15/477,115, filed Apr. 2, 2017, dated Oct. 24, 2019.
Williams, Richard; Notice of Allowance for U.S. Appl. No. 15/477,115, filed Apr. 2, 2017, dated Nov. 29, 2019, 9 pgs.
Williams, Richard; Requirement for Restriction/Election for U.S. Appl. No. 15/477,115, filed Apr. 2, 2017, dated Mar. 13, 2019, 5 pgs.
Williams, Richard; Non-Final Office Action for U.S. Appl. No. 15/477,115, filed Apr. 2, 2017, dated Sep. 19, 2018, 12 pgs.

* cited by examiner

DEPLOYED ELECTROMAGNETIC RADIATION DEFLECTOR SHIELD ASSEMBLY

CROSS-REFERENCE TO RELATED APPLICATIONS

The present application is a divisional of U.S. application Ser. No. 15/477,115, filed Apr. 2, 2017, which is hereby specifically incorporated by reference herein in its entirety.

TECHNICAL FIELD

This invention relates to the protection of manned spacecraft, manned base stations as well as sensitive robotic spacecraft from high energy solar (cosmic) radiation, CMEs (Coronal Mass Ejections), or planetary (Jupiter and the like) radiation. It does so without creating a magnetic field or plasma field that impinges on said spacecraft and the like.

BACKGROUND

Spaceflight outside of the Earth's protective magnetic field is dangerous from a cosmic radiation perspective. Inside Earth's magnetic field, where the manned International Space Station (ISS) orbits, the radiation encountered is minimal and almost all is deflected by our planet's magnetic fields. However, outside that protective shield, the Sun's solar wind (high energy radiation, solar energetic particles or SEPs) consisting of protons, electrons, alpha particles and plasmas continuously bombards the spacecraft for the months or years of spaceflight. On occasion the Sun produces a CME (Coronal Mass Ejection) that vastly increases the energy and volume of this radiation. These particles damage human DNA as well as living tissue and can destroy sensitive electronics.

The typical remedy has been to harden the electronics and software from these high-speed particles and placing heavy shielding in these manned or sensitive areas. This adds for considerable weight (and cost) to the launch vehicle, reducing needed payload, and is passive in nature.

These SEPs and CMEs can be deflected by a magnetic field as known by those skilled in the art to pass around the spacecraft and not be absorbed by it. This deflection of solar wind and radiation is well understood to be due to the Lorentz force. However, a magnetic field that is attached to the spacecraft (as seen in prior art) and enclosing it would cause other shielding issues with equipment and would require much more electrical power to operate (due to the need to enclose the entire spacecraft within that attached magnetic field), not to mention that it would perturb the data collection and transmissions of the spacecraft. In addition, much like the Van Allen radiation belt around the Earth, the generated magnetic field can capture some of this solar radiation as a plasma within the magnetic torus further impeding scientific data collection with its close position to the spacecraft.

SUMMARY

Disclosed is a deployed electromagnetic radiation deflector shield comprising a power supply; and an electromagnet configured to generate a magnetic field to deflect radiation; wherein the deployed electromagnetic radiation deflector shield is deployed at a distance away from one of a spacecraft and a base station to minimize an effect of the magnetic field on the one of the spacecraft and base station.

Also disclosed is a deployed electromagnetic radiation deflector shield system comprising a base station on a planetary surface; a deployed electromagnetic radiation deflector shield comprising; an electromagnet configured to generate a magnetic field to deflect radiation; and a plasma injector configured to inject a plasma gas into the magnetic field to boost the effectiveness of the magnetic field; and a power supply.

Also disclosed is a method for using a deployed electromagnetic radiation deflector shield comprising providing the deployed electromagnetic radiation deflector shield, the deployed electromagnetic radiation deflector shield comprising a power supply and an electromagnet; deploying the deployed electromagnetic radiation deflector shield to at least a minimum distance from one of a spacecraft and a base station; and supplying power from the power supply to the electromagnet to generate a magnetic field to deflect radiation and to create a zone of minimum radiation.

A deployed electromagnetic radiation deflector shield assembly is disclosed, the assembly comprising a base station on a ground surface; a deployed electromagnetic radiation deflector shield comprising an electromagnet configured to generate a magnetic field configured to deflect radiation from a radiation source; and an upright supporting the deployed electromagnetic radiation deflector shield at a distance away from the base station, and wherein the distance is configured to prevent the magnetic field from interfering with the base station.

A method for using a deployed electromagnetic radiation deflector shield is also disclosed, the method comprising providing the deployed electromagnetic radiation deflector shield, the deployed electromagnetic radiation deflector shield comprising a power supply and an electromagnet; supporting the deployed electromagnetic radiation deflector shield on an upright, the deployed electromagnetic radiation deflector shield supported at least a minimum distance from a base station positioned on a ground surface; and supplying power from the power supply to the electromagnet to generate a magnetic field to deflect radiation and to create a zone of minimum radiation around the base station, wherein the minimum distance is configured to prevent the magnetic field from interfering with the base station.

A deployed magnetic field of a deployed electromagnetic radiation deflector shield (DERDS) would act like a goalie in a soccer match and move forward toward the threat (Sun and/or other radiation sources) and reduce the deflection angle needed to have these particles miss a spacecraft. It would provide a magnetopause or zone of minimal radiation in which the spacecraft or an extra-planetary base station would reside. This aspect of the DERDS would be deployed to prevent its own generated magnetic field from impinging on the spacecraft and to prevent disturbing data collection or requiring added shielding for it. It would also require a smaller magnetic field and reduce the power requirements to it. If an electromagnet of the DERDS were cooled sufficiently to become superconducting, the strength of the magnetic field would be vastly increased and its electrical power requirements would commensurately lower. It is estimated that a power supply of about 500 watts would be all that is required to sustain this electromagnetic field at maximum deflection for most known CMEs. The magnetic field strength can be calculated by Maxwell's equations by those skilled in the art and incorporated within computer controls of a magnetic field generator. The DERDS could be maintained at a much lower power setting during the bulk of a mission, allowing that power to be used for normal spacecraft or an extra-planetary base station requirements.

In moments of intense radiation events (CMEs—alerted by NASA/ESA), all non-essential power (20 kw+) could be diverted to the DERDS for maximum deflector shielding. It is envisioned that any long duration manned spacecraft would have large solar panels as well as RTGs (radioisotope thermal generators), and that manned extra-planetary or moon base stations would also have modular nuclear power units such as molten salt reactors, or liquid fluoride thorium reactors that would produce a reliable abundance of electrical power.

The invention (DERDS) provides a magnetic field that will deflect SEPs and CMEs and other harmful solar and cosmic rays away from a manned spacecraft, robotic spacecraft, or manned extra-planetary base stations using an electromagnet that is deployed between the spacecraft/station and the source of radiation (the Sun and the like) and creates a magnetosphere or zone of minimal radiation in which the spacecraft or base station would reside.

The invention (DERDS) is deployed to remain between the Sun (or Jupiter/Saturn for those missions) and the spacecraft. It utilizes on board cosmic ray sensors to note the need for the strength of the magnetic field, and on-board sensors to position itself directly in line between the Sun/Jupiter/Saturn and the protected spacecraft or station. On board computers and thrusters (it is envisioned as either ion or gaseous) will maintain the required position, so that the magnetic field is positioned for the best deflection angle based on incoming SEPs, etc. The deflection by the magnetic field of the incoming particles is well understood, by those skilled in the art, through the Lorentz force. Only enough power is generated to provide sufficient deflection. Power is increased substantially during high threat CMEs.

The DERDS is deployed in space from the protected spacecraft. In one embodiment, an umbilical cord/tether emanates from the protected spacecraft to provide electrical power to the DERDS. It also provides back up commands for positioning. The DERDS has on board thrusters to allow it to move into the proper position both in angle and distance from the spacecraft. The DERDS can also be mounted on a telescoping solid mount to the spacecraft and thereby remove the need for thrusters and associated controls to maintain proper magnetosphere positioning, as it would move as a rigid attachment to the spacecraft.

In addition, in an embodiment the DERDS magnetic field can be varied in both direction, intensity, and time by use of both AC and DC electrical power inputs and varied as needed to optimize the deflection angle and power requirements (the field perturbations and strength needed is well understood by those skilled in the arts and utilizes Maxwell's equations for calculations). The magnetic field can be perturbed in irregular or set patterns by on board computers and sensors as needed to maintain the proper deflection of these SEPs, CMEs, and other cosmic rays.

On board the DERDS is a super conducting electromagnet that contains sufficient cooling (liquid helium, nitrogen etc.) and shielding from the Sun to maintain the magnet at superconducting temperatures when needed for magnetic field strength. It is envisioned that the electromagnet can also be operated without superconductivity, particularly at the larger distances from the Sun.

The magnetic field strength of $1\times10^{-5}$ Tesla up to 10 Tesla should be sufficient to deflect SEPs and other energetic particles of 10 to 50 MEV. This should be obtained with nominal 500 watts (or more) of electrical power from the protected spacecraft.

In one embodiment, it is envisioned that if the DERDS is not to be tethered to the protected spacecraft, and it can be a self-contained but deployed satellite/spacecraft of its own, having its own foldable solar arrays, RTG, or battery power supplies and transformers/rectifiers/inverters to fluctuate the magnetic field as needed for optimized performance. It would keep in formation and proper position with its on board sensors and thrusters (much like current quadcopters drones can maintain formation autonomously).

A reason for this invention to be deployed is to create a magnetic field that will not need to be so large (with a much larger power requirement) as to encompass the entire protected spacecraft, and not allow its magnetic field to interfere with said spacecraft. In addition, it is envisioned that should any charged particles/ions get trapped by the DERDS magnetic field (like Earth's Van Allen Radiation belts), they also would not affect the protected spacecraft or extra-planetary base station. On another embodiment, the DERDS can have a plasma (Barium or Lithium) ejector component that can be disbursed into the generated magnetic field to increase the field strength (much like a nitro boost in a car engine) when life threatening SEPs or CMEs occur.

The use of the DERDS will reduce the need for additional shielding for long-range missions from Earth and therefore reduce weight and cost of the launch vehicle. It is envisioned that the added weight of the DERDS is lower than the added passive shielding requirements for the same radiation level protection. Having a DERDS on Jupiter/Saturn missions would allow greater time for data collection due to the longer time available for orbits than could be had with just wildly eccentric orbits and passive hardening of the spacecraft. Due to the enhanced protection by the DERDS from the Jupiter's massive radiation the spacecraft can stay in orbit far longer and collect more data from not only Jupiter, but the Jovian moons of Ganymede, Callisto, Io, and Europa. The same positive effect would be had on missions to Saturn and its moons.

BRIEF DESCRIPTION OF THE DRAWINGS

The features and components of the following figures are illustrated to emphasize the general principles of the present disclosure. Corresponding features and components throughout the figures may be designated by matching reference characters for the sake of consistency and clarity. Some embodiments of the present invention (DERDS) are illustrated as an example and are not limited by the figures of the accompanying drawings, in which like references may indicate similar elements and in which.

DETAILED DESCRIPTION

The terminology used herein is for the purpose of describing embodiments only and is not intending to be limiting of the invention (also referred to herein as "DERDS"). As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that such terms, such as those defined in commonly used dictionaries, should be interpreted as having a meaning that is consistent with their meaning in the context of the relevant art and the present disclosure, and will not be interpreted in an idealized or overly formal sense unless expressly so defined.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and claims.

In the following description, for the purposes of explanation, numerous specific details are set forth in order to provide a thorough understanding of the present invention. It will be evident, however, to one skilled in the art that the present invention may be practiced without these specific details. The present disclosure is to be considered as an exemplification of the invention and is not intended to limit the invention to the specific embodiments illustrated by the figures or description below.

Figure 1:
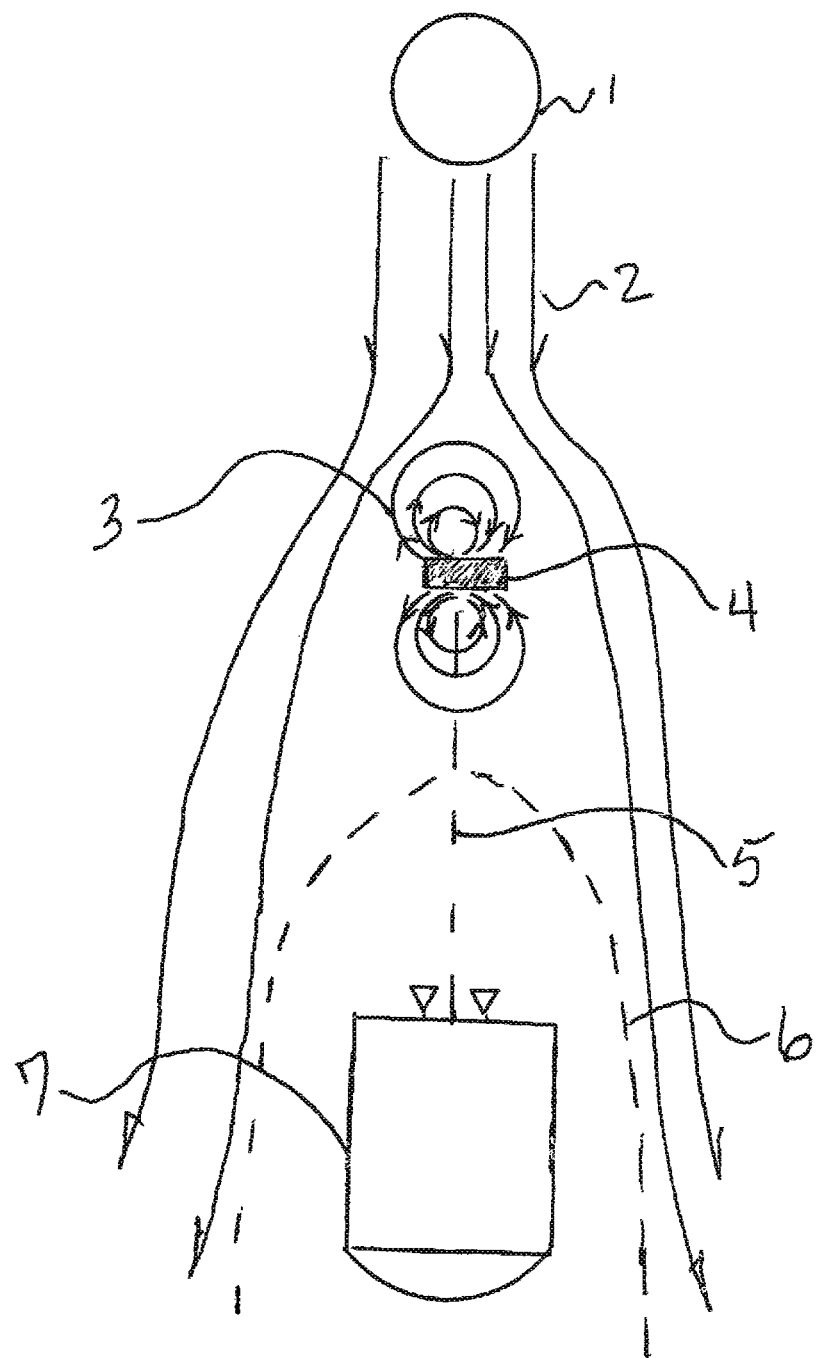
FIG. 1 depicts an embodiment of the novel use of the DERDS where it is shown to be deployed away from the spacecraft and creates a zone of minimum radiation in which the spacecraft resides. Herein it is depicted to be tethered to the spacecraft.

FIG. 1: One embodiment of the deployed electromagnetic radiation deflector shield-4, i.e. the DERDS-4, is deployed by a spacecraft-7 using an umbilical/tether device-5. The Sun-1 produces solar radiation-2. The DERDS-4 generates a magnetic field-3 which deflects the incoming radiation-2 and creates a zone of minimum radiation-6 like the Earth's magnetosphere. This is the zone-6 wherein the spacecraft-7 will reside for long durations. It is envisioned that this embodiment of the DERDS-4 will be supplied with electrical power and control of position by the spacecraft-7 through the umbilical/tether-5. The DERDS-4 can self-maneuver with on board thrusters-26 (shown in FIG. 3) and computers-90 (shown in FIG. 3) to keep the DERDS-4 aligned between the Sun-1 and the spacecraft-7 throughout the extended range of its umbilical/tether-5. During the spacecraft's launch, it is envisioned that the DERDS-4 will be fully retracted and stowed within the spacecraft-7. When the spacecraft-7 needs protection outside of Earth's magnetic field, the DERDS-4 will be deployed and moved by its thrusters-26 into the proper distance to establish its magnetic field-3 and create the zone of minimum radiation-6. It is envisioned that this distance from the spacecraft-7 will ensure minimum interference of the generated magnetic field-3 or any plasma-36 (shown in FIG. 5) that gets caught within the magnetic torus, upon the spacecraft-7. It is envisioned that the spacecraft-7 will orient itself so that the bulk of it's on board shielding will face the on-coming solar radiation-2 during CMEs or other high threat radiations.

Figure 2:
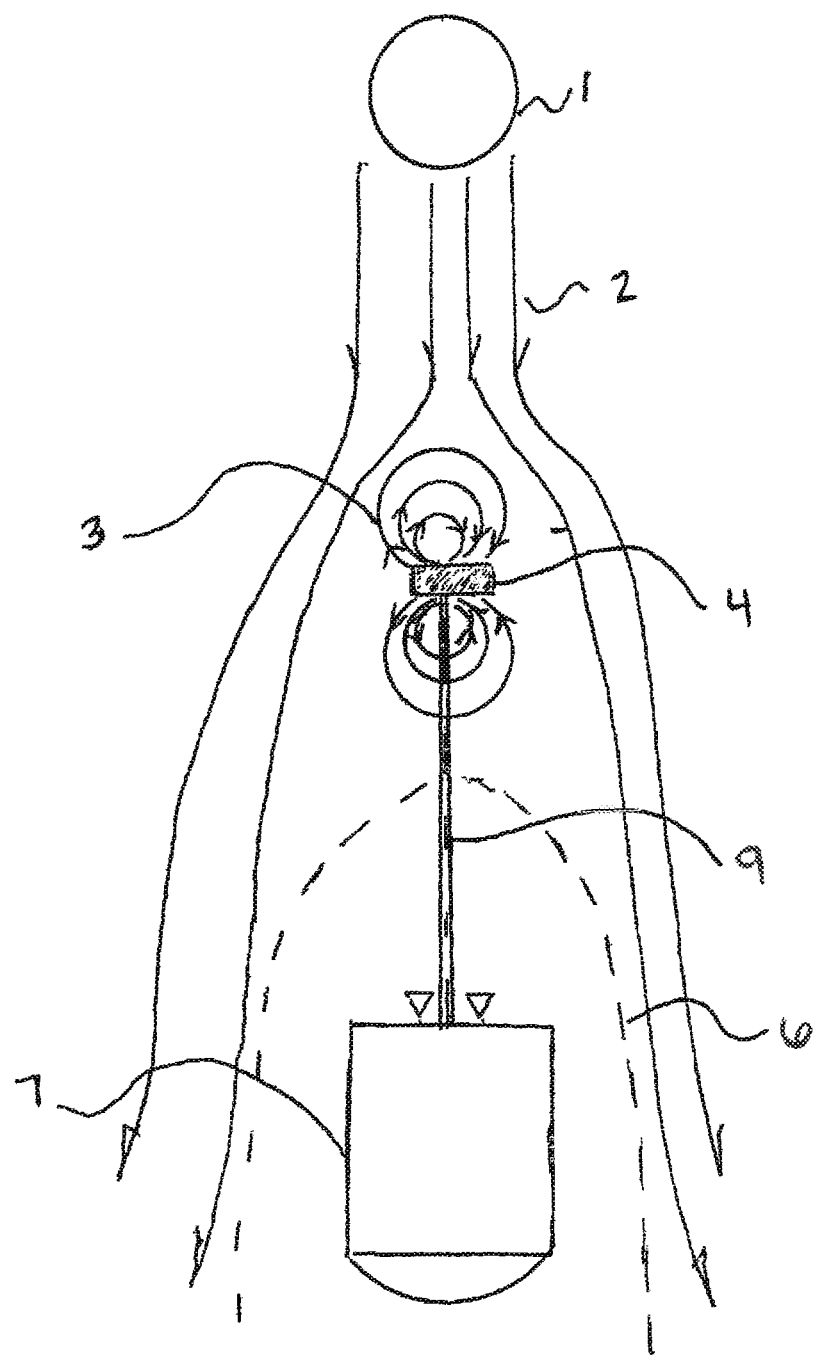
FIG. 2 depicts the deployment of the DERDS via a rigid telescopic device attached to the spacecraft. This embodiment would not require thrusters and associated equipment on the DERDS as it would move as one when the spacecraft maneuvers. Again, it shows the zone of minimum radiation created for the spacecraft.

FIG. 2: One embodiment of the DERDS-4 is deployed by the spacecraft-7 using a telescopic device-9. The Sun-1 produces the solar radiation-2. The DERDS-4 generates the magnetic field-3 which deflects the incoming radiation-2 and creates the zone of minimum radiation-6 like the Earth's magnetosphere. This is the zone-6 wherein the spacecraft-7 will reside for long durations. As the DERDS-4 is solidly attached by the telescopic device-9, there is no need for thrusters-26 or their associated equipment and supplies on the DERDS-4. It is envisioned that this embodiment of the DERDS-4 will be supplied with electrical power and control of position by the spacecraft-7 through the telescopic device-9. The spacecraft-7 can maneuver to keep the DERDS-4 aligned between the Sun-1 and itself. During the spacecraft's launch, it is envisioned that the DERDS-4 will be fully retracted and stowed within the spacecraft-7. When the spacecraft-7 needs protection outside of Earth's magnetic field, the DERDS-4 will be deployed and telescoped into the proper distance to establish its magnetic field-3 and create the zone of minimum radiation-6. It is envisioned that this distance from the spacecraft-7 will ensure minimum interference of the generated magnetic field-3 or any plasma-36 (shown in FIG. 5) that gets caught within the magnetic torus, upon the spacecraft-7. It is envisioned that the spacecraft-7 will orient itself so that the bulk of its on-board shielding will face the on-coming radiation-2 during CMEs or other high threat radiations.

Figure 3:
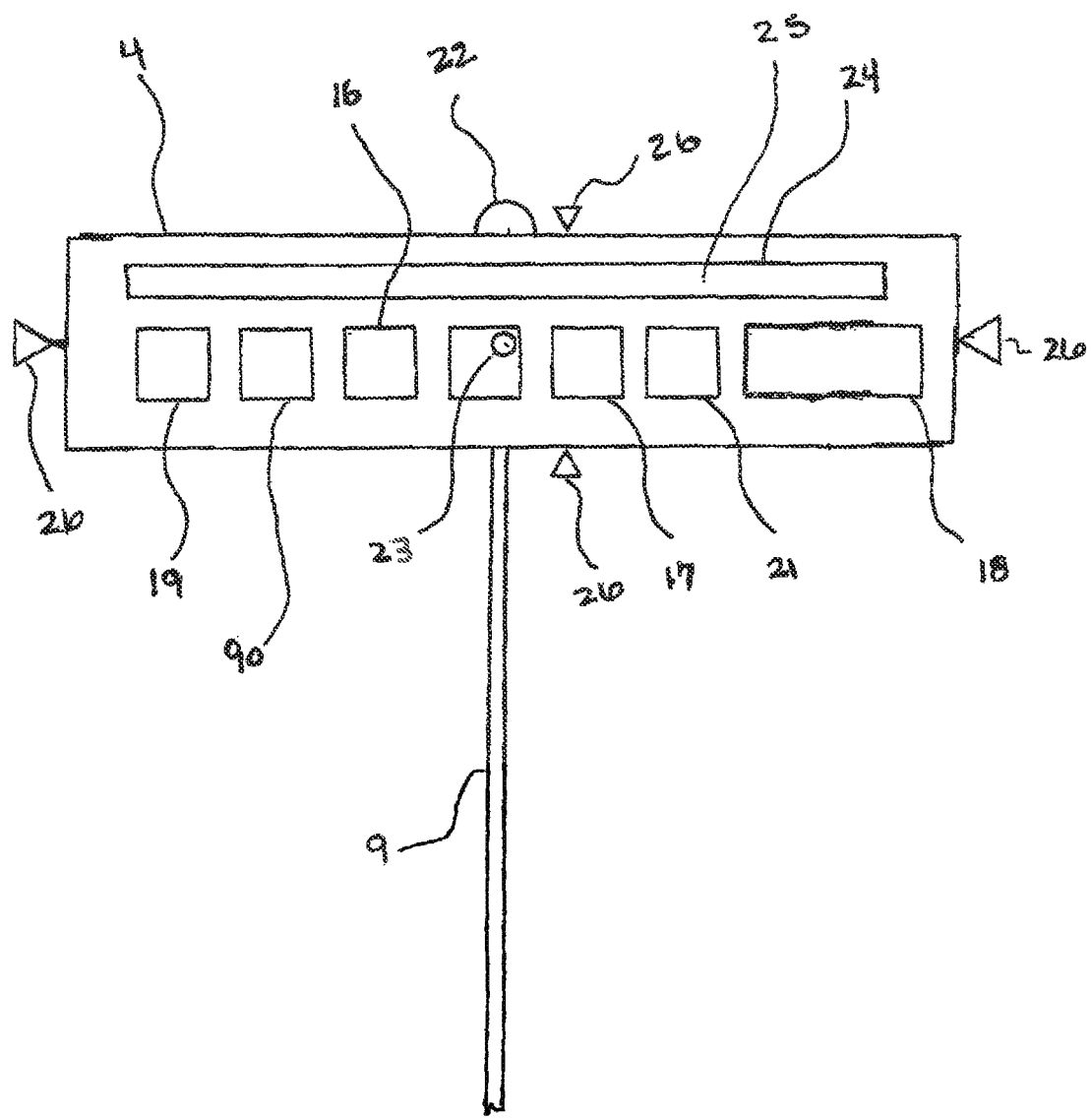
FIG. 3 depicts a preferred embodiment of the structure and components of the DERDS.

FIG. 3—One embodiment of the DERDS-4 is as an independent spacecraft which contains a 3-axis thruster control unit-16, a liquid (helium or similar) super cooling refrigeration unit-17, a power supply envisioned as an RTG (radioisotope thermal generator)-18, a gas injector-19 (barium or lithium or the like), alternative embodiment backup power supply umbilical/tether-5 or telescopic device-9 attached to spacecraft-7, communication unit-21, solar particle sensor unit-22, computerized station keeping sensor control unit-23, an electromagnetic generating unit-24. The DERDS-4 generates a strong magnetic field-3 by using the electricity from the power supply-18 applied to a super cooled electromagnet-25 of the electromagnetic generating unit-24. The super cooling refrigeration unit-17 supplies a refrigerant liquid-29 (shown in FIG. 4) in a closed loop system or the like through coils-27 (see FIG. 4) surrounding the electromagnet-25 enabling super conductivity of the electromagnet-25 thereby requiring less electricity for a given needed magnetic field strength. It is envisioned that an embodiment of this DERDS-4 can comprise the gas injector-19 configured to inject a plasma gas into the magnetic field-3 to assist the magnetic field-3 in deflecting certain solar radiations-2 or neutralizing certain unwanted captured solar plasmas-36 (shown in FIG. 5) in the magnetic torus. The DERDS-4 will maintain the proper distance from the spacecraft-7 and ensure a safe zone of minimum radiation-6 by using its solar particle sensor unit-22 and position itself using its thrusters-26 commanded by its computers-90. Further embodiments of the DERDS-4 have no physical connections like the umbilical/tether-5 to the spacecraft-7 once deployed. It is envisioned that the DERDS-4 would be release from its enclosure within the spacecraft-7 when the spacecraft-7 is leaving the protection of the Earth's magnetic field. Once deployed it will remain in the required formation by use of its thrusters-26 and the computer station keeping control unit-23. Very little volume of fuel or thrust would be needed as the DERDS-4 will remain in the required position (due to Newton's laws) unless the spacecraft-7 alters its trajectory. When that occurs the DERDS-4 will generate similar commands by its own solar particle sensor unit-22 or back up commands through the communications unit-21 and or umbilical/tether-5, to continue to provide that required zone of minimum radiation-6 for the spacecraft-7.

Figure 4:
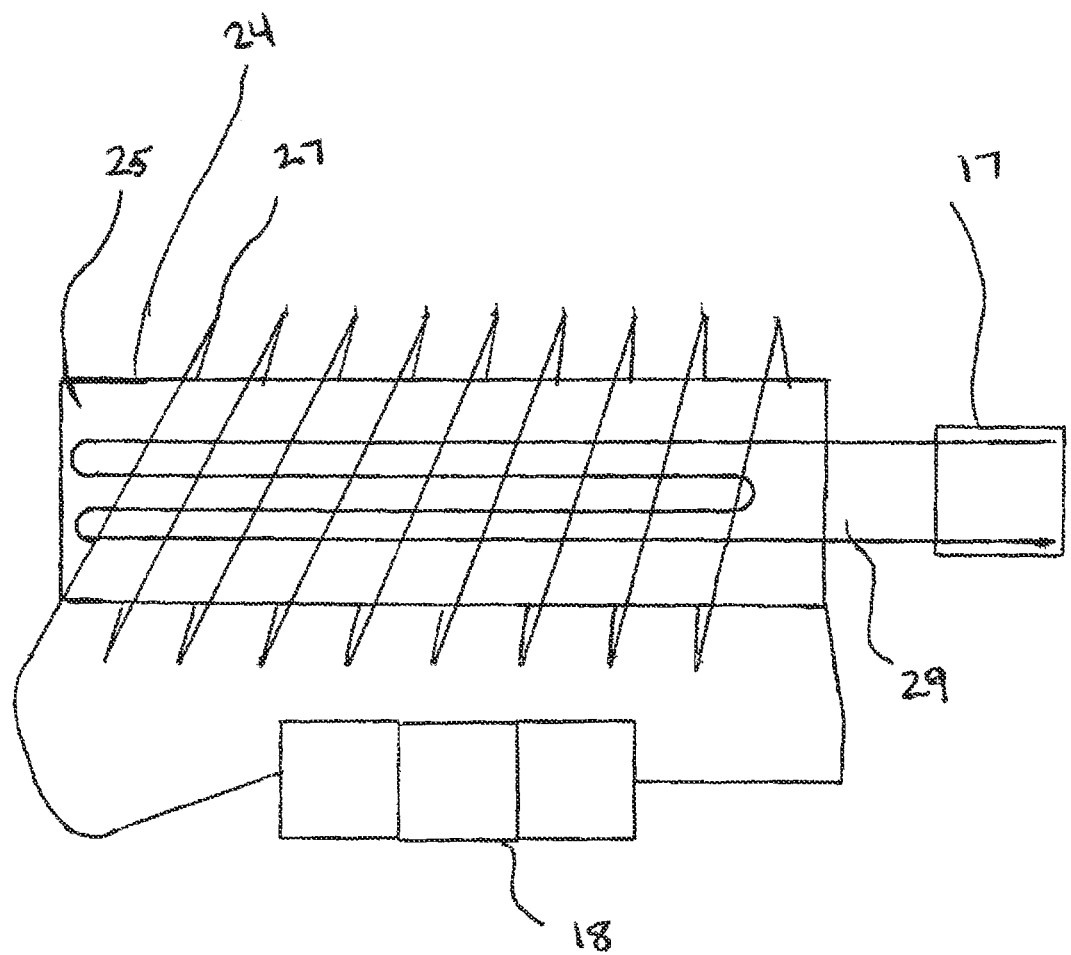
FIG. 4 depicts an embodiment of a superconducting electromagnet within the DERDS.

FIG. 4: In this embodiment of the electromagnet-25 within the DERDS-4 is the coil-27 (e.g., copper windings) (or other conducting metal), the internal power unit for electricity RTG-18 (or fuel cell/spaceship provided power or the like), a cooling refrigeration unit-17, and a closed (or open) loop of the refrigerant liquid-29 (helium, nitrogen or the like). In this embodiment, it is envisioned that the refrigerant liquid-29 will reduce the temperature of the electromagnetic metal (iron, nickel, chromium and the like) of the electromagnet-25 down to that temperature in which it will behave as a superconductor (it is envisioned that this would be close to 25-50° Kelvin). In this embodiment, the power required to sustain a zone of minimum radiation-6 will be much reduced. In addition, when there is a significant SEP/CME event or any large blast of radiation-2, the DERDS electromagnet-25 will be able to produce a much stronger magnetic field-3 and through the Lorentz forces keep the radiation-2 well deflected. NASA/ESA (i.e., the National Aeronautics and Space Administration and the European Space Agency) have satellites and Earth bound stations that constantly monitor the Sun-1 and would be able to communicate with the spacecraft-7 and or DERDS-4 directly to warn of ensuing radiation events. The onboard solar particle sensor unit-22 (shown in FIG. 3) would also be able to ramp up the magnetic field-3 when these radiation events arrive.

Figure 5:
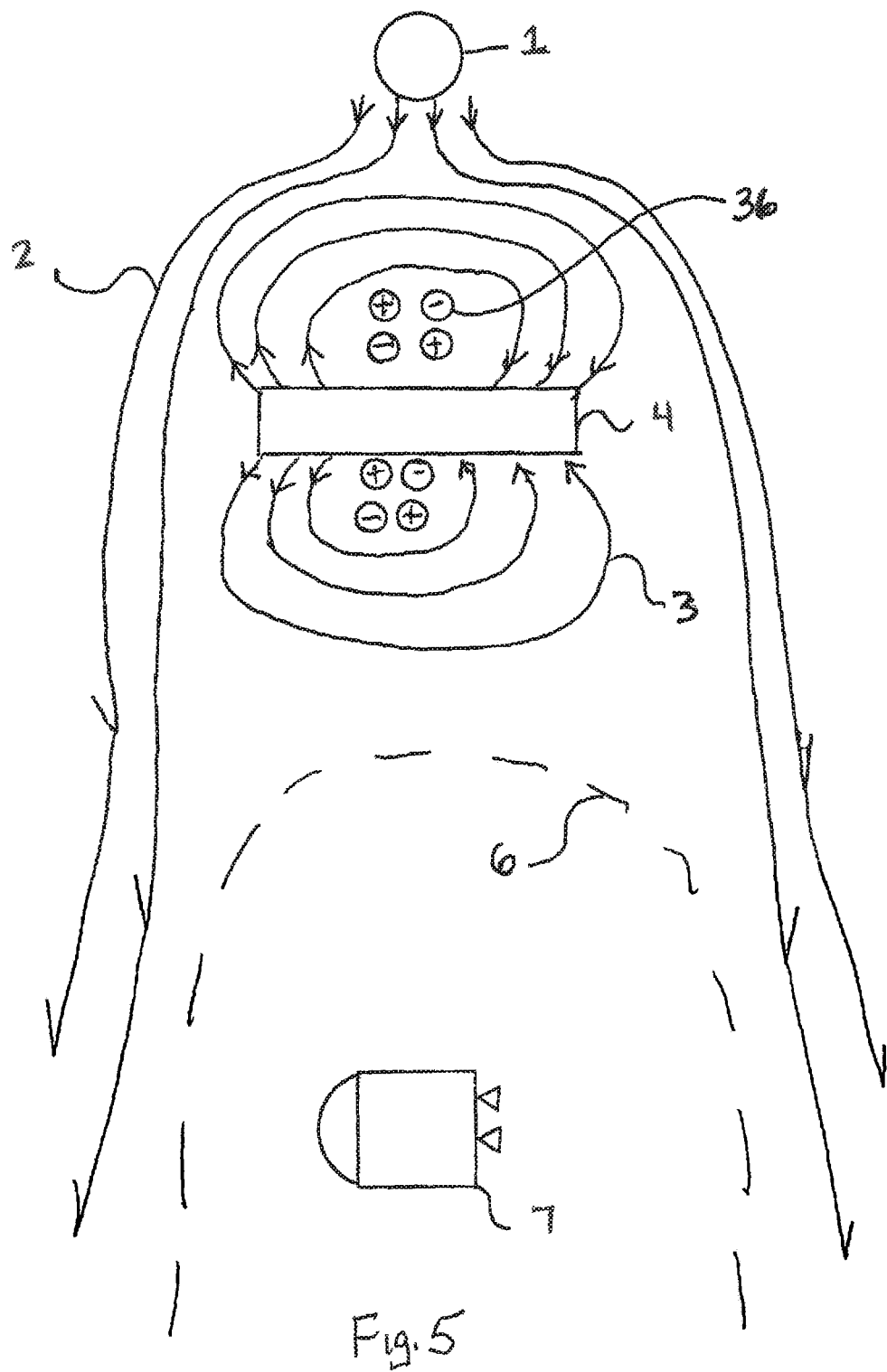
FIG. 5 depicts an embodiment of the fully deployed and unattached DERDS. It shows one possibility of where plasma can be contained within a magnetic torus generated by the DERDS. It shows a magnetic field and plasma field positioned away from the spacecraft.

FIG. 5: With the DERDS-4 in deployed operation, generating a magnetic field-3 which produces the Lorentz forces to deflect the incoming solar radiation-2 from the Sun-1 (or other radiation source like Jupiter or Saturn for those missions). The zone of minimum radiation-6 is thereby created as the solar radiation-2 has been deflected. It is within the zone-6 where the spacecraft-7 will reside for the duration of its travel, for example, from Earth to Mars and beyond. This zone-6 will allow sustained operation with minimal additional shield required for the spacecraft-7. An important embodiment of this DERDS-4 is that the magnetic field-3 generated, and the possible undesirable plasma-36 trapped within the magnetic torus (like the radiation trapped within the Earth's Van Allen belts) will not be impinging on the spacecraft-7 incurring other undesirable effects on the spacecraft-7.

Figure 6:
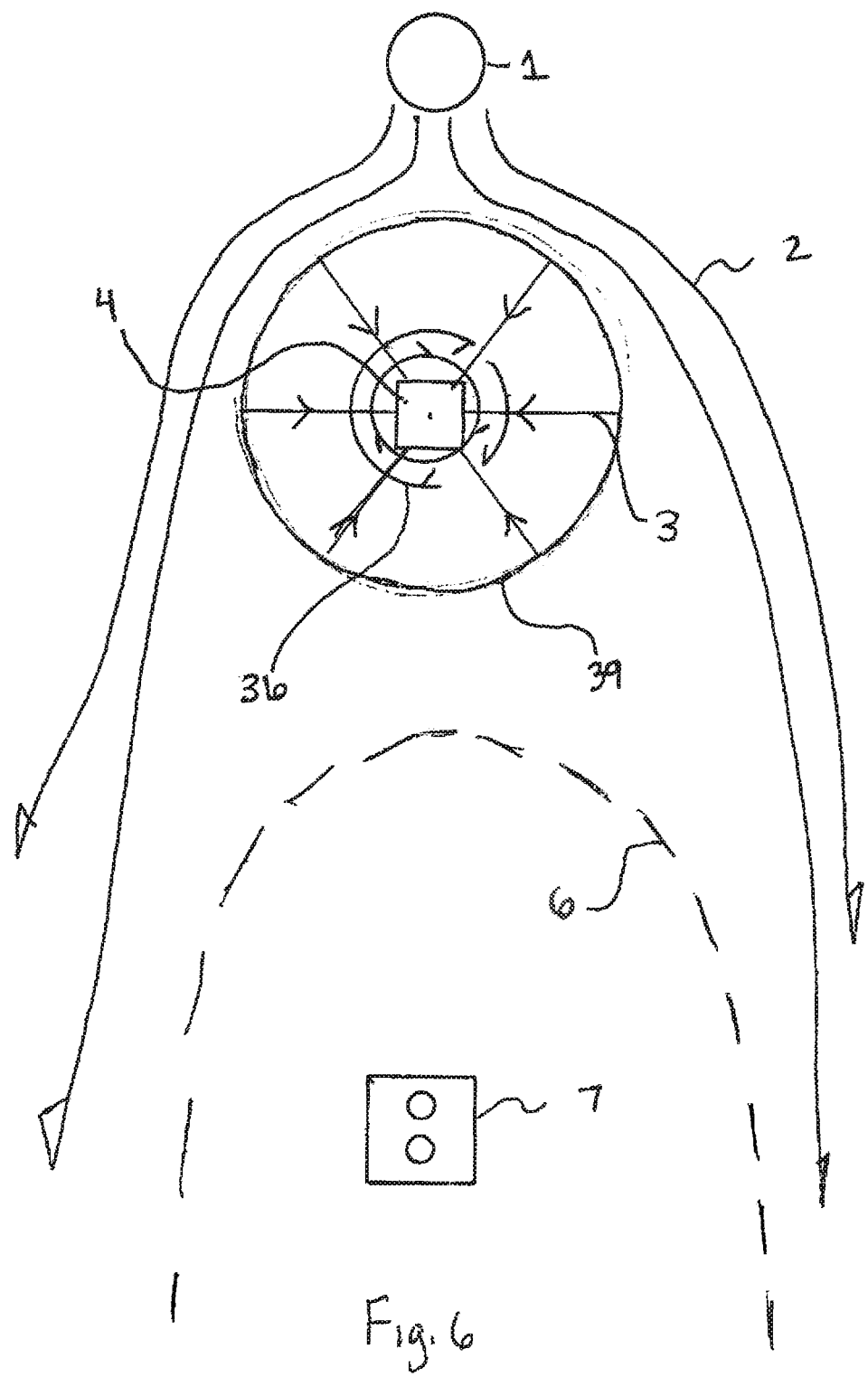
FIG. 6 is a side view of FIG. 5 illustrating the magnetic field and possible plasma field positioned away from the spacecraft.

FIG. 6: This is FIG. 5 rotated to view the DERDS-4 operation from the side. With the DERDS-4 in deployed operation, generating a magnetic field-3 and a deflection limit-39 which produces the Lorentz forces to deflect the incoming solar radiation-2 from the Sun-1 (or other radiation source like Jupiter or Saturn for those missions). The zone of minimum radiation-6 is thereby created as the solar radiation-2 has been deflected. It is within the zone-6 where the spacecraft-7 will reside for the duration of its travel, for example, from Earth to Mars and beyond. This zone-6 will allow sustained operation with minimal additional shield required for the spacecraft-7. An important embodiment of this DERDS-4 is that the magnetic field-3 generated, and the possible undesirable plasma-36 trapped within the magnetic torus (like the radiation trapped within the Earth's Van Allen belts) will not be impinging on the spacecraft-7 (as seen in prior art) incurring other undesirable effects on the spacecraft-7.

Figure 7:
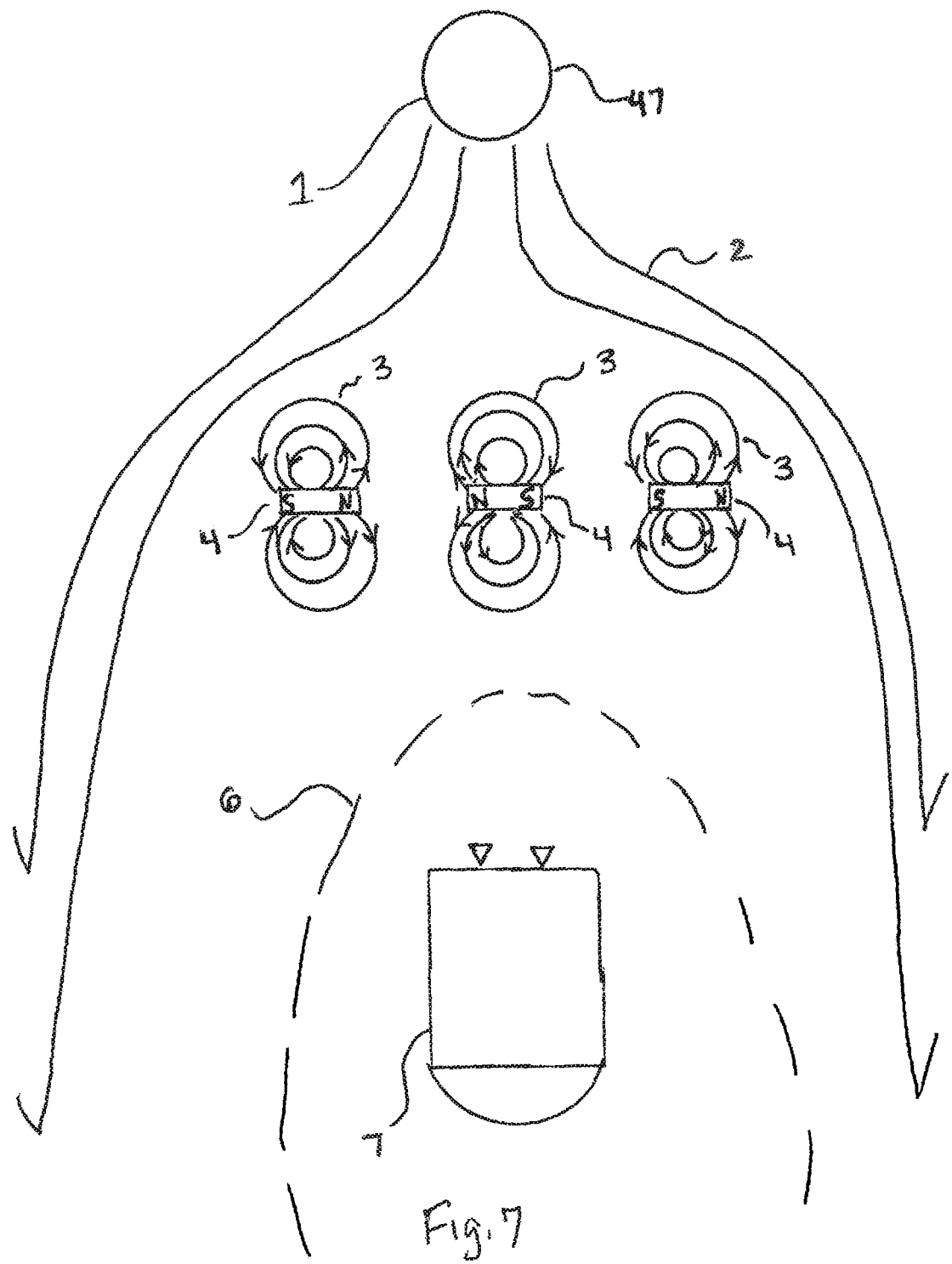
FIG. 7 depicts an embodiment of a formation of smaller DERDS creating a larger or differently shaped zone of minimum radiation.

FIG. 7: In this embodiment, there are there are several DERDS-4 deployed and maintaining formation with one another (much like current quadcopter drones are able with those skilled in the arts) to maintain a magnetic field-3 that deflects incoming solar radiation-2 from a radiation source-47 (like the Sun-1, Jupiter or Saturn and the like). The deflection due to Lorentz forces creates a zone of minimum radiation-6 within witch the spacecraft-7 resides for long duration flight. This zone-6 can be made larger or have its shape changed by the repositioning of the formation of DERDS-4. When not needed, the additional DERDS-4 can be re-stowed on board the spacecraft-7, and used as spares for long duration flight. These DERDS-4 can be made smaller in size and have smaller magnetic field generation capability and use their collective magnetic fields-3 for the protection of the spacecraft-7. As the spacecraft-7 goes into less dense solar radiation-2 (in missions to Jupiter or Saturn and beyond and the like) the smaller DERDS-4 might only be needed singly, with the rest dispatched or re-stowed as spares. It is envisioned in this embodiment that the DERDS-4 so deployed can be smaller and have electromagnets-25 that are not boosted in strength by the need for super conductivity and the refrigeration needed. In another embodiment, the DERDS-4 can be deployed in a formation to deflect radiation-2 from multiple sources such as from the Sun-1 and flight near Jupiter or Saturn. One DERDS-4 protects from the solar radiation-2 and the other positions itself to deflect the planetary radiation.

Figure 8:
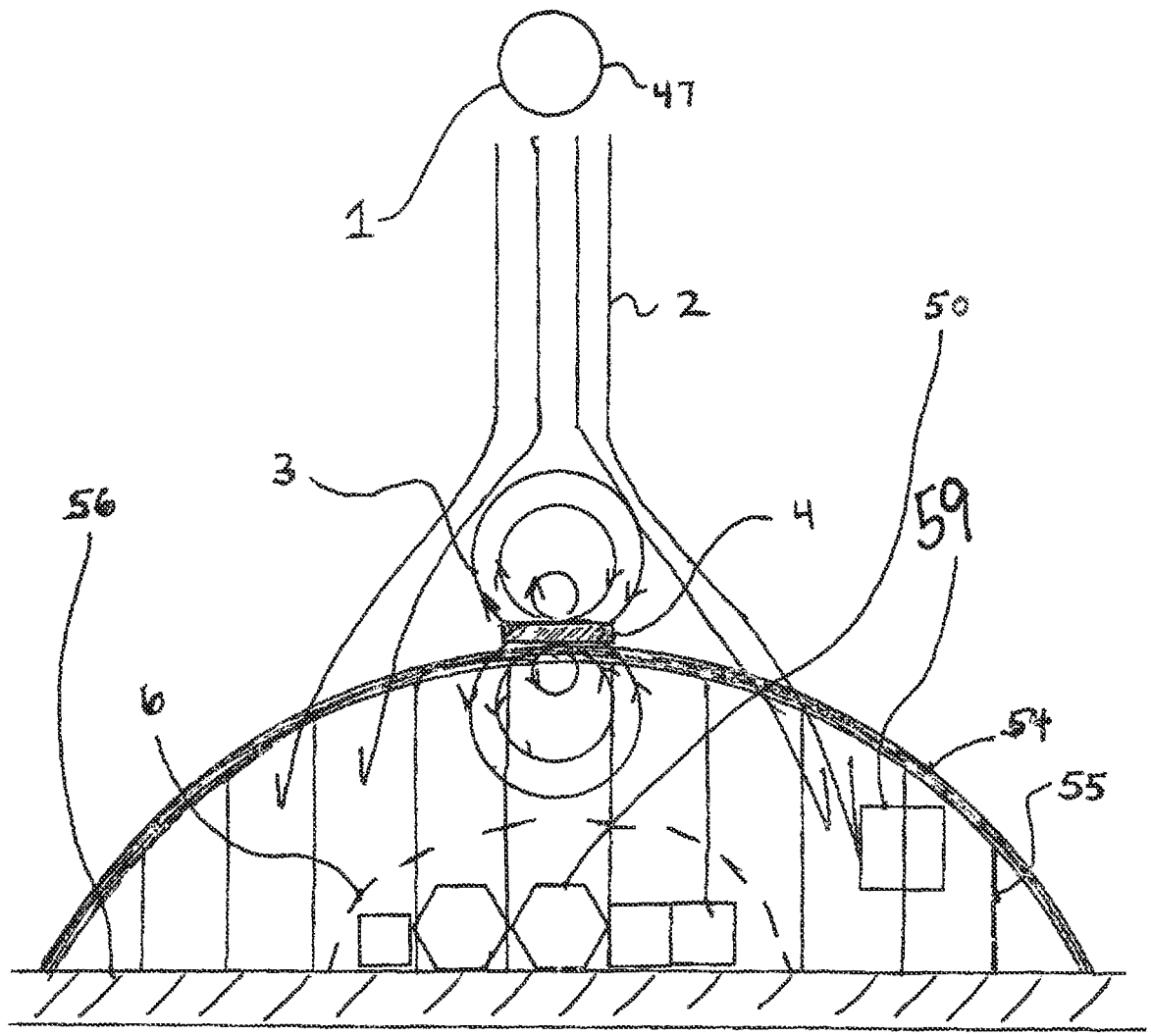
FIG. 8 illustrates an embodiment of the DERDS as deployed on an ecliptic track and providing a large zone of minimum radiation for an extra-planetary or moon base.

FIG. 8: In this embodiment, a manned or unmanned base station-50 on a planetary body (such as Mars or one of the moons of Jupiter/Saturn and the like) would need a large zone of minimum radiation-6 and has a DERDS-4 mounted but moveable to be constantly inline between the radiation source-47, such as the Sun-1, and the base station-50. This embodiment of the DERDS-4 is deployed on an ecliptic track-54 which is supported by uprights-55 anchored in the surface-56 of a planet or moon. The base station-50 is protected by the zone of minimum radiation-6 which is generated by the magnetic field-3 of the DERDS-4. The Sun-1 (or other radiation source-47 like Jupiter or Saturn) creates the incoming solar radiation-2 and is deflected by the magnetic field-3 through the Lorentz forces. It is an embodiment of this DERDS-4 to be deployed so that its generated magnetic field-3 does not interfere or impinge on the base station-50. Additionally, any plasmas-36 (shown in FIG. 5) caught within the magnetic fields torus are also kept away from the base station-50. It is envisioned that any manned base station-50 will need long-term electrical power and hence in this embodiment the power would be supplied by a modular nuclear reactor of the molten salt variety (liquid fluoride thorium reactor or the like or numerous RTGs-18). The power requirements for the base station-50 would likely be from 100 kilowatts to 1 megawatt. Additional or back up power could be provided by solar panels-59.

Figure 9:
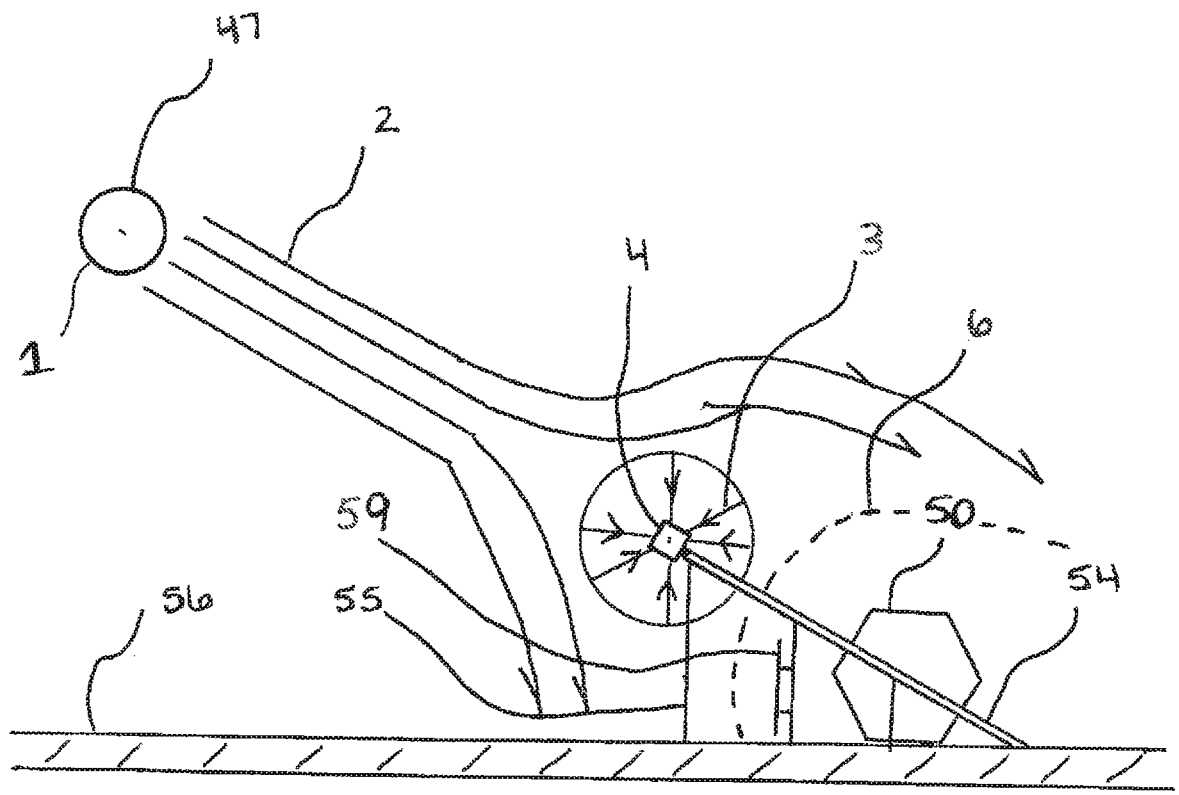
FIG. 9 is a side view of FIG. 8. It shows how the ecliptic track allows the DERDS to be properly positioned always, as it moves in concert along the track as the Sun (or other source of radiation) arcs across the horizon. It thereby keeps the zone of minimum radiation surrounding the base station as the radiating emitting body moves across the sky.

FIG. 9: This is a view of FIG. 8 rotated 90° to better view the DERDS-4 on the ecliptic track-54 and the DERDS-4 remaining in line with the radiation source-47 and incoming solar radiation-2 and the base station-50. In this embodiment, a manned or unmanned base station-50 on a planetary body (such as Mars or one of the moons of Jupiter/Saturn and the like) would need a large zone of minimum radiation-6 and has a DERDS-4 mounted but moveable to be constantly inline between the radiation source-47 (as it arcs across the horizon) and the base station-50. This embodiment of the DERDS-4 is deployed on an ecliptic track-54 which is supported by uprights-55 anchored in the surface-56 of a planet or moon. The base station-50 is protected by the zone of minimum radiation-6 which is generated by the magnetic field-3 of the DERDS-4. The Sun-1 (or other radiation source like Jupiter or Saturn and the like) creates the incoming solar radiation-2 and it is deflected by the magnetic field-3 through the Lorentz forces. It is an embodiment of this DERDS-4 to be deployed so that its generated magnetic field-3 does not interfere or impinge on the base station-50. Additionally, any plasmas-36 (shown in FIG. 5) caught within the magnetic fields torus are also kept away from the base station-50. It is envisioned that any manned base station-50 will need long-term electrical power and hence in this embodiment the power would be supplied by a modular nuclear reactor of the molten salt variety (liquid fluoride thorium reactor or the like or numerous RTGs-18). The power requirements for the base station-50 would likely be from 100 kilowatts to 1 megawatt. Additional or back up power could be provided by solar panels-59.

That which is claimed is:

1. A deployed electromagnetic radiation deflector shield assembly comprising:
    a base station on a ground surface;
    a deployed electromagnetic radiation deflector shield comprising an electromagnet configured to generate a magnetic field configured to deflect radiation from a radiation source; and
    an upright anchored in the ground surface, the upright supporting the deployed electromagnetic radiation deflector shield at a distance away from the base station, and wherein the distance is configured to prevent the magnetic field from interfering with the base station;
    wherein the deployed electromagnetic radiation deflector shield is deployed on an ecliptic track to remain aligned between the radiation source and the base station.

2. The deployed electromagnetic radiation deflector shield assembly of claim 1, wherein the ground surface is one of a planetary surface and a moon surface.

3. The deployed electromagnetic radiation deflector shield assembly of claim 1, wherein the magnetic field is further configured to deflect plasmas.

4. The deployed electromagnetic radiation deflector shield assembly of claim 1, further comprising a power supply configured to power the deployed electromagnetic radiation deflector shield.

5. The deployed electromagnetic radiation deflector shield assembly of claim 1, further comprising a solar panel.

6. The deployed electromagnetic radiation deflector shield assembly of claim 5, wherein the solar panel is mounted to the upright.

7. The deployed electromagnetic radiation deflector shield assembly of claim 1, wherein the magnetic field is configured to vary in strength to optimize a zone of minimum radiation.

8. The deployed electromagnetic radiation deflector shield assembly of claim 4, wherein the power supply comprises a nuclear reactor.

9. A method for using a deployed electromagnetic radiation deflector shield comprising:
    providing the deployed electromagnetic radiation deflector shield, the deployed electromagnetic radiation deflector shield comprising a power supply and an electromagnet;
    supporting the deployed electromagnetic radiation deflector shield on an upright, the upright anchored to a ground surface, the deployed electromagnetic radiation deflector shield supported at least a minimum distance from a base station positioned on the ground surface; and
    supplying power from the power supply to the electromagnet to generate a magnetic field to deflect radiation and to create a zone of minimum radiation around the base station, wherein the minimum distance is configured to prevent the magnetic field from interfering with the base station;
    moving the deployed electromagnetic radiation deflector shield along an ecliptic track to maintain the position of the deployed electromagnetic radiation deflector shield between the radiation source and the base station.

10. The method of claim 9, wherein the entire base station lies within the zone of minimum radiation.

11. The method of claim 9, further comprising positioning the deployed electromagnetic radiation deflector shield between a radiation source and the base station.

12. The method of claim 11, further comprising deflecting plasmas with the magnetic field.

13. The method of claim 9, wherein supplying power from the power supply comprises supplying power from at least one of a nuclear reactor and a solar panel.

* * * * *